Sept. 30, 1924.  
I. KERTES  
1,510,063

SAUSAGE LINKING MACHINE

Filed Jan. 18, 1924   2 Sheets-Sheet 1

Isidore Kertes  
Inventor

By his Attorney Julian J. Wittal

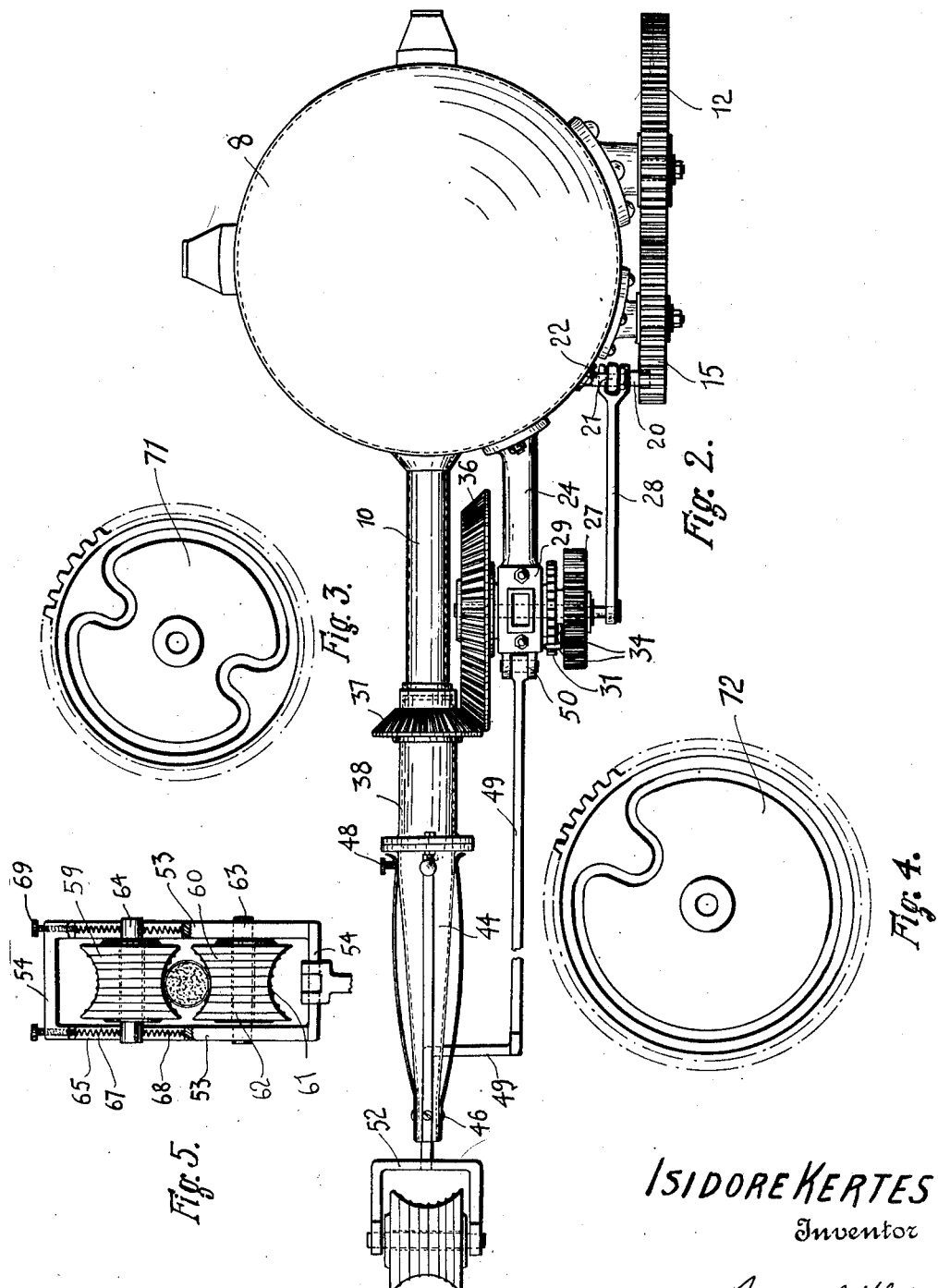

Patented Sept. 30, 1924.

1,510,063

UNITED STATES PATENT OFFICE.

ISIDORE KERTES, OF NEW YORK, N. Y.

SAUSAGE-LINKING MACHINE.

Application filed January 18, 1924. Serial No. 687,019.

*To all whom it may concern:*

Be it known that I, ISIDORE KERTES, a citizen of the United States, and resident of New York, in the county of New York and State of New York, have invented certain new and useful Improvements in Sausage-Linking Machines, of which the following is a specification.

This invention relates to certain new and useful improvements in mechanism for automatically twisting a line of sausage into links, and it consists in the various features of construction and in the arrangement and combination of parts hereinafter described and more particularly pointed out in the annexed claims.

A main object of my invention is the provision of a mechanism of the class specified, so constructed and arranged that it may be used in connection with certain standard sausage stuffing machines, more particularly in connection with that type of stuffing machines which are manually operated and which are not equipped with valves controlling the discharge of the meat. For instance, a standard type of stuffing machines with which my improved mechanism will co-operate and may be used as an attachment is known commercially as the "Buffalo upright stuffer."

A distinguishing aim of my invention is to provide a mechanism capable of automatic operation and adapted to receive its power directly from the machine to which it is applied or attached. Another aim is to provide a construction that will admit of the employment of interchangeable cam wheels, through the use of which the lengths of the sausage links may be varied. Other aims of the invention relate to certain features of adjustment that are concerned with the length of the sausage links, with the diameter of the sausage links, with means for gripping the sausage while it is being twisted, and with holding a line of sausage casings.

The preferred embodiment of my invention is illustrated in the accompanying drawings, forming a material part of this specification, in which similar characters of reference indicate like parts in the several views, and in which:—

Fig. 2 is a top plan view of the same.

Figs. 3 and 4 are detail views of the types of interchangeable cam wheels that may be employed.

Fig. 5 is a detail view showing the adjustable gripping mechanism for holding the sausage while it is being twisted into links.

Figures 1, 6:
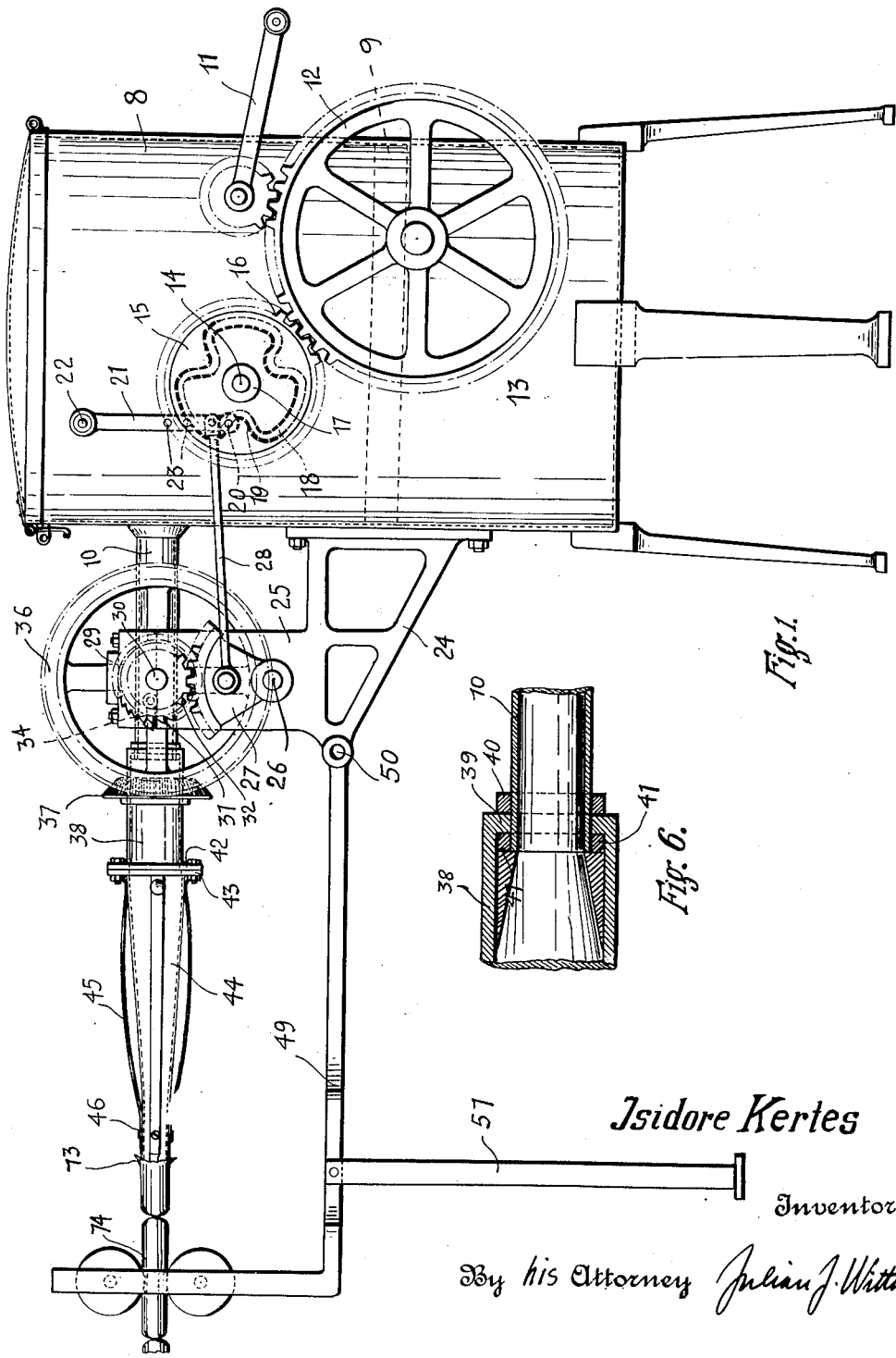
Fig. 1 is a side elevational view, showing my improved mechanism in connection with a manually operated stuffing machine.
Fig. 6 is a detail view of the connection between the stationary and rotary parts of the stuffing tube line.

In the accompanying drawings, my invention is illustrated in connection with a standard type of manually operated sausage stuffing machine, known commercially as the "Buffalo upright stuffer." In this well known upright machine, the prepared sausage meat is introduced into the upright casing 8 upon a vertically reciprocating piston 9 which compresses it and forces it out through the discharging barrel 10 at the front end of the casing near its top. A hand crank 11 is employed to actuate a train of gears and other mechanism for reciprocating the piston, the train of gears including a larger exterior spur gear 12 located on the side 13 of the casing 8.

My improved mechanism is operated directly from the spur gear 12 and in order to accomplish this, I secure to the casing side 13 a stud 14 on which is revolubly mounted a cam wheel 15 having a toothed periphery 16 adapted to mesh with said spur gear 12. As the cam wheel is one of a number of interchangeable cam wheels, it is removably mounted on the stud which, for convenience, has its outer end threaded for the reception of a securing nut 17. On its inner face the cam wheel 15 is provided with a continuous slot 18 having three equi-spaced inward paths or deformations 19 in radial relation. Engaged in the slot 18 is a roller or follower 20 which is carried on the lower end of an arm 21 depending from and swinging on a pivot stud 22 secured to the casing side 13. To provide for the adjustments hereinafter to be described, this swinging arm 21 is provided with a row of apertures 23.

To the front of the casing 8, below the discharge barrel 10, I bolt a main frame 24 formed with an upright portion 25 on which is provided a stud 26 for the purpose of supporting for swinging movement a segment gear 27 which is pivotally connected in upright position with the swinging arm 21 by the link 28. At the top end of the frame portion 25, in conjunction with a cap 29 bolted thereon, I provide a bearing in which is rotatably held a short shaft 30. At the outer side of the frame portion 25 there is secured to the shaft 30 a ratchet wheel 31. Loosely mounted on this shaft, in front of the ratchet wheel 31 is a spur gear 32 which meshes with the segmental gear 27 and which is provided with a pawl 34 pivoted on the same and yieldingly urged into engagement with the teeth of the ratchet wheel by a spring device or by any of the other suitable and well known methods used in such instances. It will be obvious from this construction that when the segment gear is moved in one direction the loose gear 32 will drag the pawl over the teeth of the ratchet wheel, the spring device yielding to permit this action, and also that when the segment gear is moved in the opposite direction the pawl will force the turning of the ratchet wheel and by that action also effect the turning of the shaft 30. In the embodiment herein exemplified, the shaft 30 will not be actuated when the roller traverses the inwardly directed path of a slot deformation, but it will be actuated each time it traverses the outwardly directed path of the same. The specific arrangement and proportions of these parts are preferably such that the loose gear 32 will be turned approximately one revolution on each throw of the segment gear, it being the intention to turn the shaft 30 about one revolution every time the roller moves through the outwardly directed path of a slot deformation.

On the side of the frame portion 25 that comes adjacent to the discharging barrel 10, there is secured to the shaft 30 a large bevel gear 36 in mesh with a bevel gear 37 attached to a barrel 38 rotatably engaged on the end of the discharging barrel 10 and forming an extension thereof. As herein shown, provision for rotating the barrel 38 is made by forming thereon an internal annular flange 39 designed to have turning fit between two rings 40 and 41 which are screw threaded upon the barrel 10 or otherwise secured to it. At its front end, the barrel 38 is formed with an exterior annular flange 42, to which is bolted a cooperating flange 43 provided for the purpose on a conically shaped discharging tube 44, designed to compact the discharging sausage line and to reduce it to the diameter desired preparatory to the twisting operations. The sausage casing or skin to be stuffed (shown removed on the drawings for the sake of clearness) is supported around the conical tube 44 upon a series of spaced-apart spring-fingers 45 arranged longitudinally on said tube. These spring-fingers are bowed longitudinally as shown, and at their front ends they are permanently secured to the tube 44, as at 46, while at their rear ends they are provided with adjusting set-screws 48 which are screw threaded into the conical tube 44. Through these set-screws the outward bends in the spring-fingers may be increased or diminished to tighten or loosen the sausage casing as desired, or to accommodate different sizes of sausage casings. It is, nevertheless, obvious that other well known or standard methods may be used for this purpose. The sausage casing is preferably engaged upon the fingers in folds or convolutions in order that a considerable length may be accommodated and also in order that it may be readily withdrawn as the line of discharging sausage is pressed thereinto.

A horizontal frame 49 which is hinged at 50 to the main frame 24, extends forwardly below the rotatable barrel 38, and conical tube 44 in line with the same, its hinged connection being such that it may be moved or swung downwardly when desired. The forward portion of this horizontal frame is supported upon a hinged leg 51. The front end of the horizontal frame is bifurcated as at 52, and from it rises a vertical frame consisting of side elements 53 and bottom and top cross pieces 54. Supported in the vertical frame in superimposed relation are two rollers 59 and 60 whose faces are made with deep grooves or concavities 61 and are provided with annular corrugations, as 62. The roller 60 turns on a fixed axis 63 that connects the side elements 53, while the roller 59 turns on a vertically movable axis 64 in order that it may be adjusted bodily with respect to the roller 60. Provision for this adjustment is made by vertically slotting the side elements, as at 65, and securing the ends of the axis 64 in said elements with a sliding fit therein. The adjustment of the shaft 64 is executed by making use of the upper and lower coiled springs 67 and 68 and the adjusting screws 69 tapped through the top of each side element.

The sausage casing is engaged around the spring-fingers 45 as hereinbefore described and hangs over the mouth of the conical tube 44, as at 73, to receive therefrom the discharging line of sausage and is then entered between the rollers 59 and 60 to pass lengthwise between the same (as at 74), being held against turning by the corrugations on the faces of the rollers. Each time the shaft 30 is actuated, the rotatable barrel 38 and conical tube 44 are rotated several times through the instrumentalities of the speed multiplying gears 36 and 37 with the result that the sausage skin is twisted upon itself forming a sausage link. The length of the sausage link depends upon the number of inward deformations, as 19, provided on the face of the cam wheel. Thus, the cam wheel 15 having three such deformations will at each revolution cause the production of three sausage links, while the use of a cam wheel as at 71 having two slot deformations, will at each revolution produce two sausage links, and the use of a cam wheel as at 72 will bring about the twisting of one sausage link only. The diameter of the sausage links is determined by the internal diameter of the mouth or smaller end of the conical tube 44, and in this connection it is contemplated to provide with each equipment several interchangeable tubes as 44, each having a mouth of different internal dimension.

Having thus described my invention what I claim as new, is:—

1. In mechanism of the character described, the combination with a conical tube supported for rotation and means thereon for holding a sausage casing in position to be filled with sausage meat pressed through said tube, of a pair of superposed rollers arranged to receive the stuffed casing, said rollers having annular corrugated surfaces to prevent lateral turning of the stuffed casing, one of said rollers having a spring-pressed axis adjustable towards and away from the other roller, and means for intermittently rotating said conical tube to twist the sausage line into links.

2. In mechanism of the character described, the combination with a conical tube supported for rotation and means combined therewith for holding a sausage casing in position to be filled with sausage meat pressed through said tube, of a pair of concave rollers arranged to receive the sausage line and permit its advancing, said rollers being provided with gripping corrugations to prevent lateral turning of the sausage line, a driven cam wheel, a shaft intermittently operated from said cam wheel, and speed multiplying gears operated by said shaft for twirling said conical tube to twist the sausage line into links.

3. The combination with a sausage stuffing machine having a discharging barrel, of a conical tube rotatably supported from said barrel to receive the sausage line therefrom, means combined with said tube for holding a sausage casing to receive a sausage line, a pair of concaved rollers arranged to receive the stuffed casing and advance the same, said rollers being provided with annular gripping corrugations to prevent lateral twisting of the sausage line, and means for intermittently rotating said conical tube to twist the sausage line into links.

4. The combination with a sausage stuffing machine having a discharging barrel and a driven wheel, of a conical tube rotatably supported from said barrel to receive the sausage line therefrom, means combined with said tube for holding a sausage casing to receive the sausage line, a pair of concaved rollers arranged to receive the stuffed casing and advance the same, said rollers being provided with annular gripping corrugations to prevent lateral twisting of the sausage line, a cam wheel operated by said driven wheel, a shaft and means for intermittently actuating the same from said cam wheel, and means including speed multiplying gears operated by said shaft for twirling said conical tube to twist the sausage line into links.

5. In mechanism for a sausage stuffing machine and in combination, a fixed sausage discharging barrel, a rotary barrel supported thereby to receive the sausage meat, a conical tube fast with said last barrel to rotate therewith and to receive the sausage line therefrom, means combined with said tube for holding the sausage casing which is to be stuffed with the sausage line, a pair of concaved rollers arranged to receive the stuffed casing and advance the same, said rollers being provided with annular gripping corrugations to prevent lateral turning of the sausage, and means for intermittently actuating said rotary barrel to twist the sausage line into links.

6. In a sausage stuffing machine having a discharging barrel and a driven wheel, a conical tube rotatably supported from said barrel to receive the sausage line therefrom, means combined with said tube for holding a sausage casing to receive the sausage line, means to receive the stuffed casing and advance the same, a cam wheel operated by said driven wheel, a shaft and means for intermittently operating the same from said cam wheel, and means including speed multiplying gears operated by said shaft for twirling said conical tube to twist the sausage line into links.

7. In mechanism for a sausage stuffing machine and in combination, discharging means on said machine for the sausage material, a rotary barrel co-operating with said discharging means and adapted to receive the sausage material and to pass it into the sausage casing, means for holding the sausage casing on said rotary barrel, means to receive and advance the stuffed casing, a driving wheel for the stuffing machine, a cam wheel operated by said driving wheel, and means operable by said cam wheel to intermittently twirl said rotary barrel to twist the sausage line into links.

Signed at New York in the county of New York and State of New York this 30th day of December A. D. 1923.

ISIDORE KERTES.